Dec. 12, 1961     W. R. OSBAN     3,012,427
PRESSURE-SEALING DEVICE

Filed April 4, 1961     6 Sheets-Sheet 1

INVENTOR.
WILLIAM R. OSBAN
BY
Harold L. Kauffman
ATTORNEY

Dec. 12, 1961  W. R. OSBAN  3,012,427
PRESSURE-SEALING DEVICE
Filed April 4, 1961  6 Sheets-Sheet 2

INVENTOR.
WILLIAM R. OSBAN
BY
Harold L. Kauffman
ATTORNEY

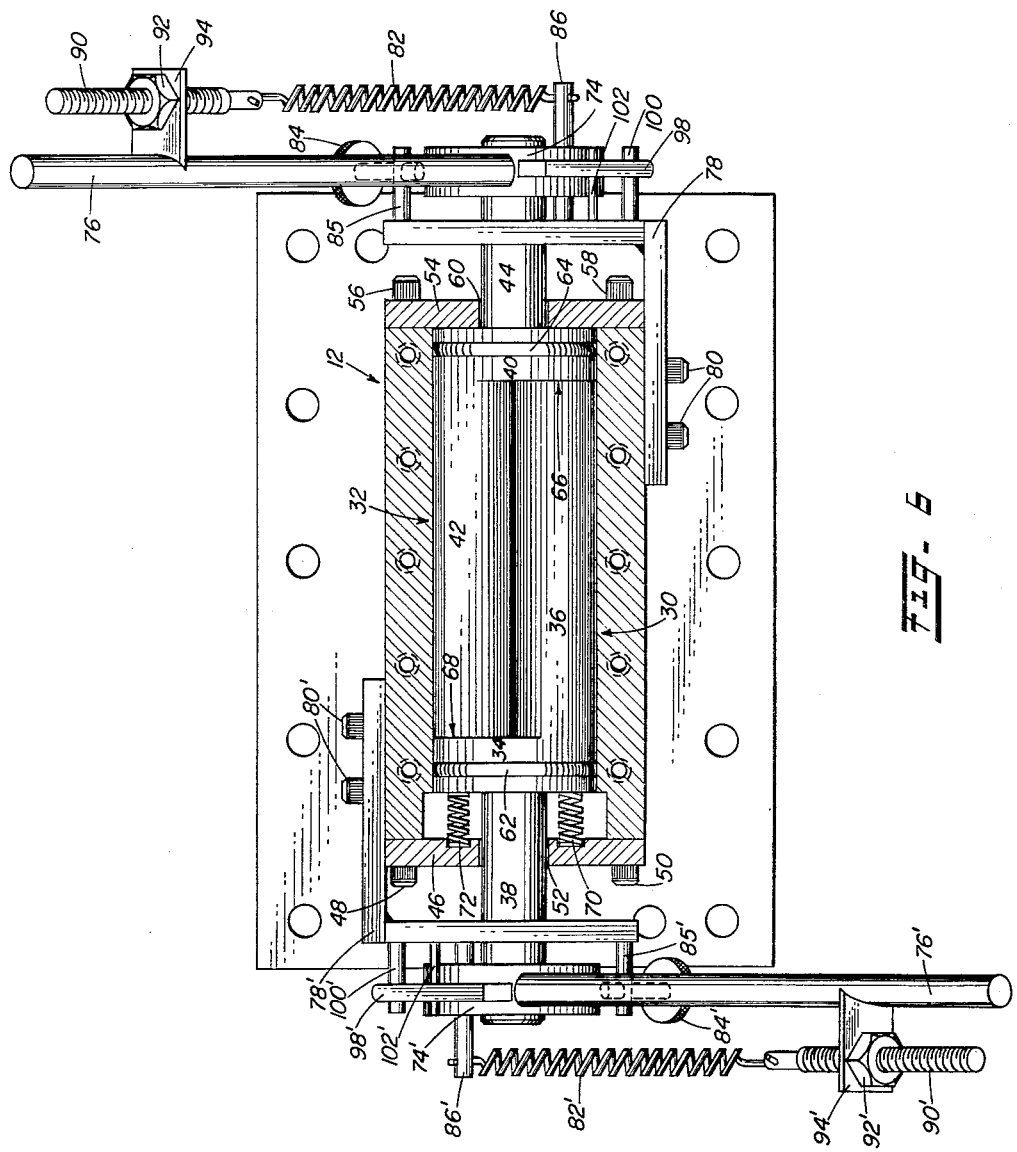

Dec. 12, 1961  W. R. OSBAN  3,012,427
PRESSURE-SEALING DEVICE
Filed April 4, 1961  6 Sheets-Sheet 4
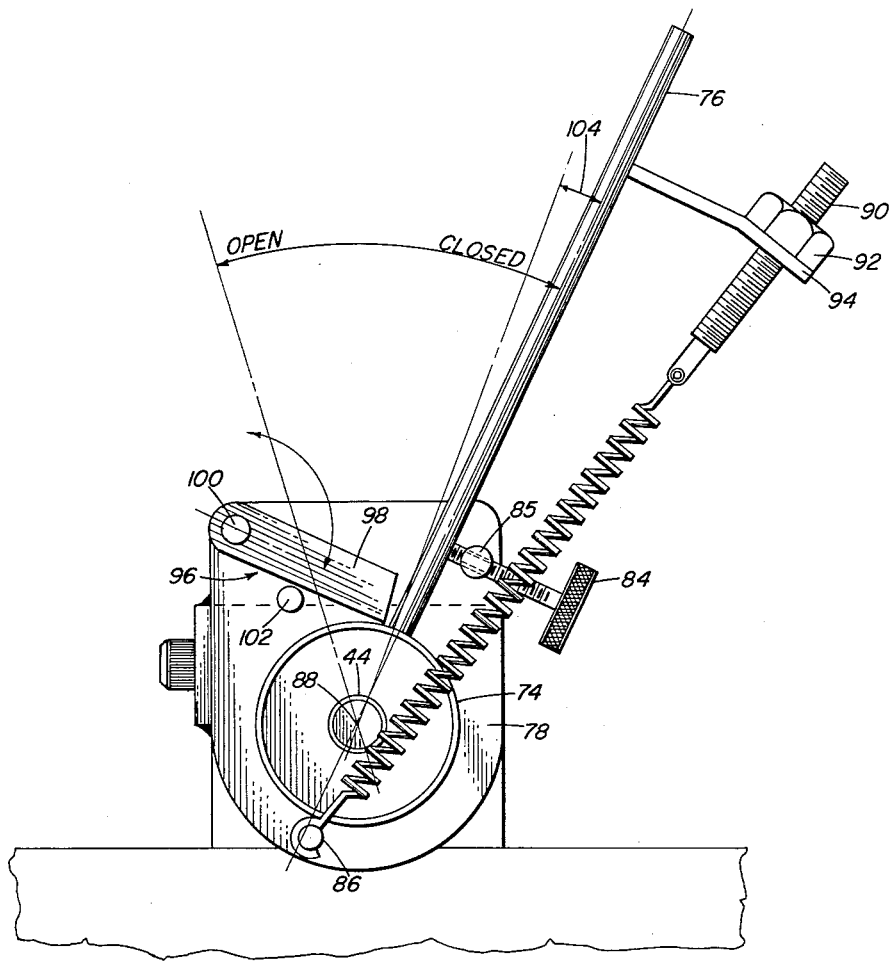
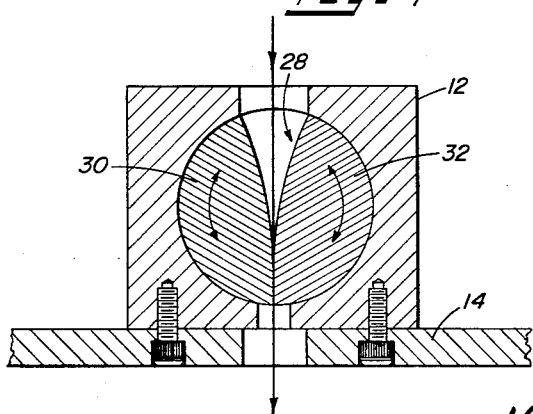
INVENTOR.
WILLIAM R. OSBAN
BY
Harold L. Kauffman
ATTORNEY Dec. 12, 1961   W. R. OSBAN   3,012,427
PRESSURE-SEALING DEVICE
Filed April 4, 1961   6 Sheets-Sheet 5

INVENTOR.
WILLIAM R. OSBAN
BY
*Harold R. Kauffman*
ATTORNEY

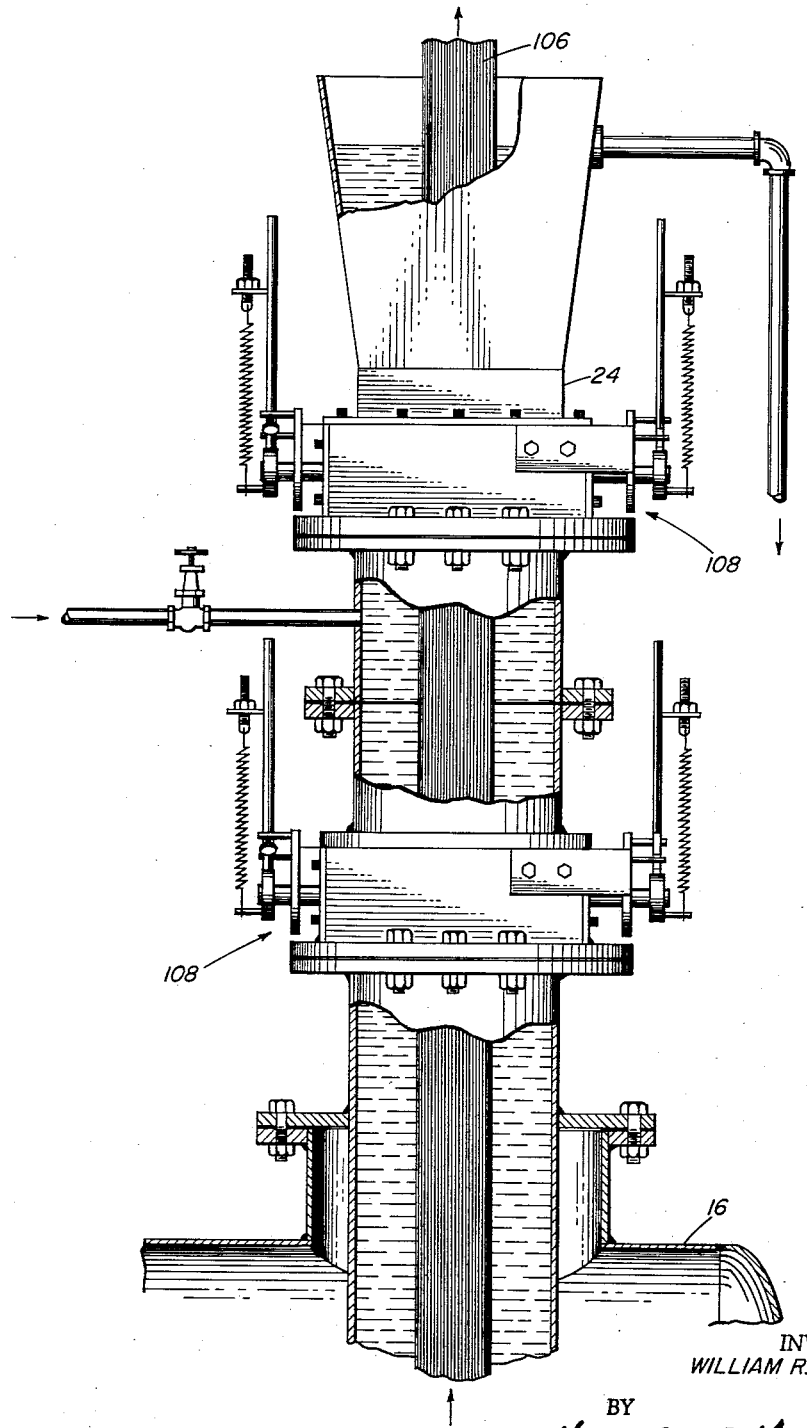

United States Patent Office 3,012,427
Patented Dec. 12, 1961

3,012,427
PRESSURE-SEALING DEVICE
William R. Osban, Gulf Breeze, Fla., assignor to American Cyanamid Company, New York, N.Y., a corporation of Maine
Filed Apr. 4, 1961, Ser. No. 100,760
11 Claims. (Cl. 68—5)

This invention relates to a sealing device and more particularly to a device or apparatus whereby elongated material can be continuously conveyed with little or no leakage between adjacent regions that are characterized by having a pressure differential therebetween. The device is especially useful in pressure-sealing strands of elongated material in flat-band form as they are continuously passed into and out of a pressure vessel.

The terms "strand," "strands," "structure" and "structures" as sometimes used generically herein are each intended to include within their meaning elongated materials in any form, including monofilaments and multifilaments in yarn, thread, fabric, rod, tape, ribbon, strand, rope, bundle, tow, or other form, and also elongated sheets, films and the like, and which are of continuous (i.e., indefinite) length.

In the preparation of many textile materials or in subjecting them to a finishing treatment, it is often either necessary or advantageous to carry out the particular operation continuously under pressure. For example, elongated filamentary material comprised of a synthetic polymer such as a polymer or copolymer of acrylonitrile or the like is often subjected, while it is moving in a continuous path, to a relatively high temperature and pressure in the presence of saturated or wet steam in order to improve its useful properties, e.g., to improve its dye-receptivity, to obviate or minimize fibrillation thereof, etc. The problems encountered in such operations, which are sometimes designated as heat-relaxing or annealing operations, are described in, for example, U.S. Patents 2,708,843 (especially column 1, line 44, through column 2, line 15) and 2,932,183 (especially column 1, lines 14–59). Such problems include damage to the strand at the ports of entry and exit; difficulty in maintaining adequate and uniform pressure in the vessel due to loss of the pressurizing medium, e.g., steam, at the entry and exit ports through which the strand passes; inability of the sealing means to handle various thicknesses of material; lack of self-adjustability or self-closing of the sealing means; difficulty in providing safe closure of the sealing device if the moving strand breaks; difficulty in providing an effective sealing unit which is relatively inexpensive, which is simple to construct and operate, which will not be subject to frequent breakdowns, and which will have a relatively long service life; as well as other problems.

It is a primary object of the present invention to provide a new and novel sealing means or unit for obviating or minimizing leakage from a pressurized region or zone through which a strand of elongated material is being continuously conducted.

Another object of the invention is to provide an adjustable device for sealing material in band form, which device is readily and economically fabricated and is simple to operate.

Still another object of the invention is to provide a sealing device which can handle various thicknesses of material and which can be operated so that the pressure on the material passing through the device is adjustable.

A further object of the invention is to provide a sealing arrangement which is self-adjusting and self-closing, which will permit the passage of uneven cross-sections of elongated material and which will close safely if the said material should break.

Another object of the invention is to provide a sealing apparatus wherein the seal can be held either in an opened position when starting up the operation of the pressure unit to which the sealing device is attached or in a closed operating position.

Still another object of the invention is to provide a sealing device which is provided with safety means to prevent accidental full opening of the seal during operation.

Further objects of the invention will be apparent to those skilled in the art from the following more detailed description when considered in connection with the accompanying drawings.

In general, the main or primary objects of the invention are accomplished by providing a sealing device which includes essentially two counter-rotating sealing elements having a novel means of sealing one piece against the other, and the body of which holds the rotating sealing elements in alignment and completes the sealing function. The rotating sealing members can be either both spring-loaded or the one may be fixed and the other spring-loaded. The spring loading is adjustable.

The novel features of the invention are set forth in the appended claims. The invention itself, however, will be best understood by reference to the following description taken in connection with the accompanying drawings of an embodiment of the invention and illustrative thereof, and wherein:

FIG. 6 is a plan view, partly in section, of the sealing device of the present invention;

FIG. 7 is an end view of the seal assembly of the present invention;

FIG. 8 is a sectional end view of the sealing members, the enclosure thereof and the adapter plate;

Figure 9:
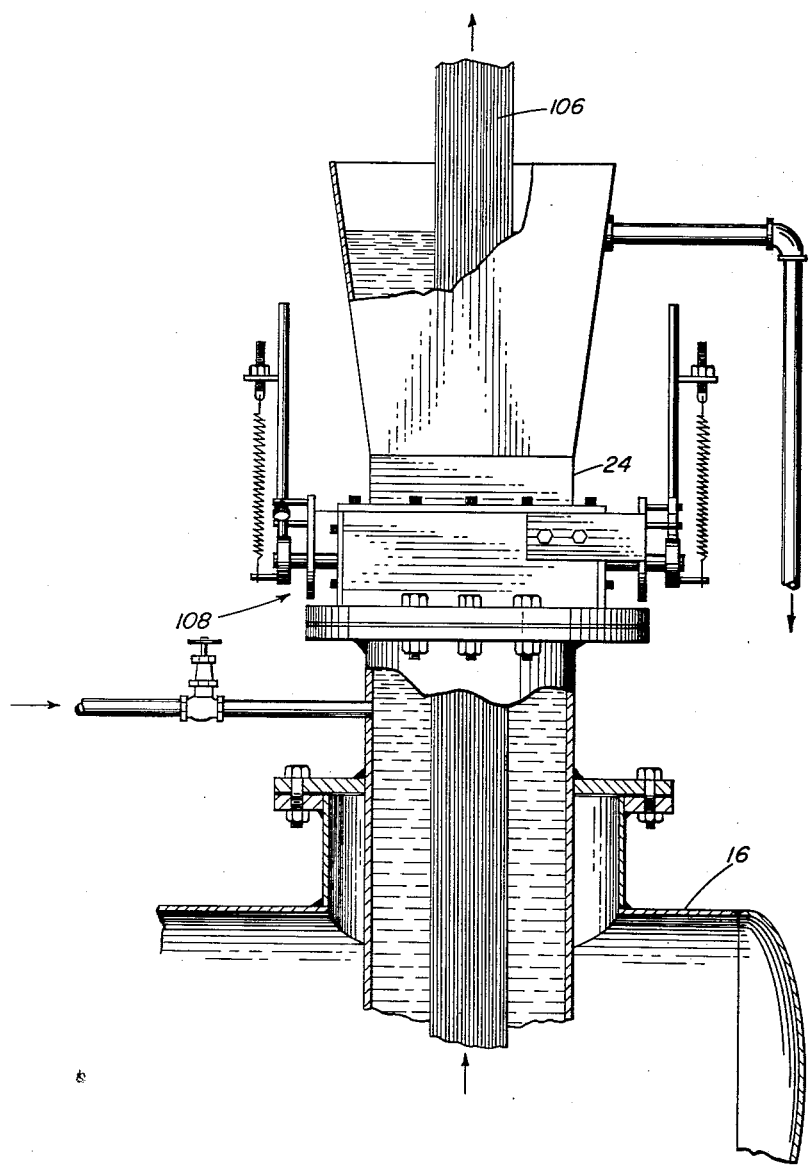

FIG. 9 is a fragmentary view, partly in side elevation and partly in section, showing one of the sealing devices of the instant invention in use in connection with a pressurized vessel and the passage of a tow of filamentary material through the exit end thereof; and FIG. 10 is a view similar to FIG. 9 but showing a plurality of the sealing devices of the present invention, specifically two arranged in tandem, in use with a pressurized vessel and the passage of a tow of filamentary material through the exit end thereof.

Figure 1:
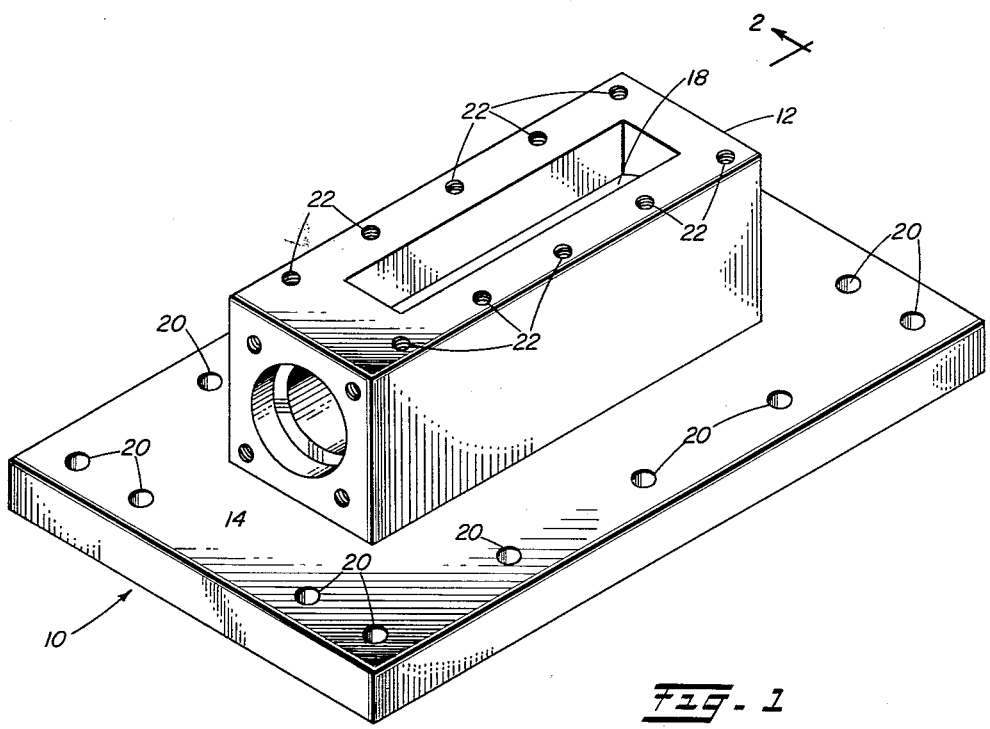
FIG. 1 is a perspective view of a portion of the seal assembly of this invention including the main body or enclosure of the seal, which is rectangular in shape with a bore and slot arrangement for other seal members, and another member in the form of a flat plate which serves as an adapter plate for fastening the sealing component to an opening on a pressure vessel.

Referring now to the accompanying drawing and especially to FIG. 1 thereof, the numeral 10 represents a structure consisting of a main body or seal enclosure 12 and a flat plate 14 which serves as an adapter plate for fastening the seal assembly to an opening on a pressure vessel. The enclosure 12 can be of any desired shape depending, for example, upon the size and form of the strand of elongated material to be passed through the sealing device. In a preferred embodiment of the invention the enclosure 12 is rectangular in shape with a bore and slot arrangement 18. The plate 14 is provided with a plurality of openings 20 for detachably fastening the said plate by means of bolts and nuts or the like to a pressure vessel or to a unit or element leading to or from such a vessel. The threaded openings 22 in the seal enclosure 12 provides means for detachably fastening the enclosure 12 to other structures outside the pressure vessel 16 such as those indicated at 24 in FIGS. 9 and 10.

Figure 2:
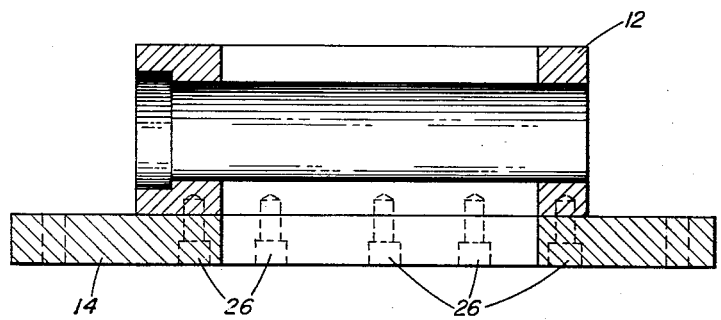
FIG. 2 is a side sectional view of the seal assembly shown in FIG. 1, taken in the direction indicated at 2 of FIG. 1.

The seal enclosure 12 is detachably fastened to the flat plate 14 as indicated at 26 in FIG. 2, socket head cap screws being conveniently used for this purpose.

The adjustable sealing assembly, designated generally by the numeral 28 in FIG. 8, consists of rotatable sealing members 30 (FIGS. 5, 6 and 8) and 32 (FIGS. 6 and 8). In the preferred embodiment of the invention sealing members 30 and 32 are identically fabricated. When assembled together as shown in FIGS. 6 and 8 they form the surfaces which contact the elongated material passing therethrough and effect the proper seal between regions of differing pressures, e.g., between the steam pressure in a pressure vessel and normal atmospheric pressure.

Figure 5:
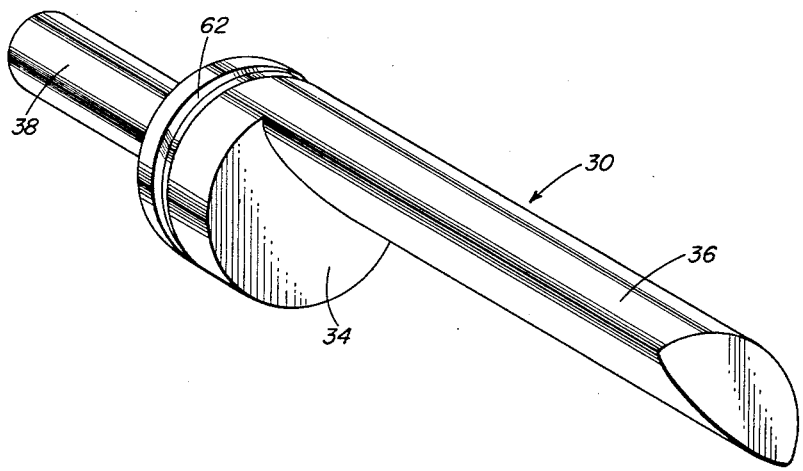
FIG. 5 is a perspective view of one of the rotatable sealing members and which, with a matching or mating rotatable sealing member, fills the bore and slot arrangement shown in FIG. 1.

Each of the rotatable sealing members 30 and 32 shown in the drawings consists of a cylindrical base, which also may be designated as a cylindrical shoulder; an extension at one end, the curvature of the outer surface of which is the same as the aforesaid cylindrical base; and a shaft at the other end. Thus, as is shown in FIGS. 5 and 6, the rotatable sealing member 30 consists of the cylindrical base 34, the extension 36 and the shaft 38; and, as is shown in FIG. 6, the rotatable sealing member 32 consists of the cylindrical base 40, the extension 42 and the shaft 44.

Figure 4:
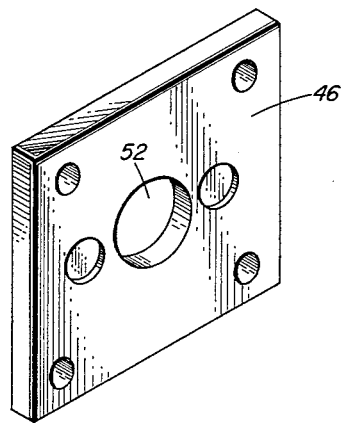
FIGS. 3 and 4 are perspective views of the right-hand and left-hand end plates, respectively, that constitute elements of the seal assembly.

The end plate 46 (FIGS. 4 and 6) is detachably fastened to the main body or seal enclosure 12, e.g., by screw fasteners, of which two are shown at 48 and 50. The end plate 46 is provided with the opening 52 (FIGS. 4 and 6) for the passage of the shaft 38. This end plate additionally serves as a positioner and retainer for the rotatable sealing member 30.

Figure 3:
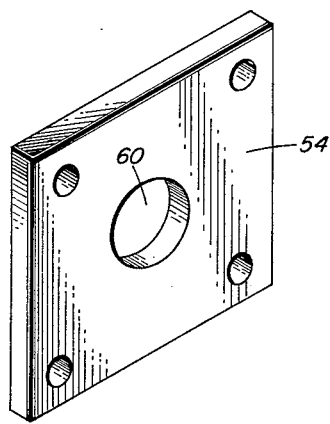

The end plate 54 (FIGS. 3 and 6) is detachably fastened to the seal enclosure 12, e.g., by screw fasteners, of which two are shown at 56 and 58. The end plate 54, which serves as a positioner and fastener for the rotatable sealing member 32, is provided with the opening 60 (FIGS. 3 and 6) for the passage of the shaft 44.

Suitable sealing means are provided for sealing the rotatable sealing members 30 and 32 in the bore of the seal enclosure 12. Such sealing means may take the form of, or may include, O-rings such as those shown at 62 and 64 (FIG. 6).

Suitable means also are provided for effecting positive contact between mating surfaces 66 and 68 (FIG. 6) of the rotatable sealing members 30 and 32. A preferred means is to use a suitable number of helically wound springs which are held in position by counterbores in the end plate 46. Thus one may use for this purpose helical springs 70 and 72 as shown in FIG. 6. The ends of these helical springs are ground square and are allowed to bear directly against the cylindrical base or shoulder 34 of the sealing member 30. Another means for effecting the desired positive contact between mating surfaces 66 and 68 is the use of a slotted spring washer between base 34 and the end plate 46. Positive contact between mating surfaces 66 and 68 is particularly desirable when the elongated material passing through the sealing device is one which might be damaged at its edges if the aforementioned mating surfaces did not fit tightly together. An example of an elongated material that might thus be damaged is a strand of a synthetic filamentary material, more particularly a flat band or tow of a filamentary material comprised of a polymer of acrylonitrile.

The sealing device of the present invention advantageously includes adjustable spirng-loading means for the rotating sealing members and safety means to prevent accidental full opening of the seal during operation. These means and other elements of the device are, for the most part, best shown in FIG. 7, while other parts are more clearly shown in FIG. 6.

Referring now to FIGS. 6 and 7 the hand wheel 74 is detachably attached, e.g., by set screws, to the shaft 44. This hand wheel, to which the handle 76 is advantageously attached, e.g., by drilling and tapping the rim of the wheel or by any other suitable means, provides a convenient means for opening the seal by rotating the rotatable sealing member 32 counter to spring force.

A suitable support advantageously is provided for attaching certain elements that constitute parts of the aforementioned adjustable spring-loading means and safety means. For example, there may be used the support 78 which is detachably attached to the seal enclosure 12 by means of screw fasteners 80 as is shown most clearly in FIG. 6.

The spring 82 is capable of being adjustably tensioned for holding the rotatable sealing member 32 closed against either the strand or structure of elongated material passing through the seal or the adjusting screw 84 depending upon the setting of the adjusting screw and the thickness of the particular elongated material. The spring allows the elongated material to open the sealing members by a lever action when a thick section of the elongated material passes therethrough. The adjusting screw 84, together with the threaded and tapped pin 85 through which it passes, can be used to establish a minimum closure of the sealing device.

The spring 82 is anchored to the anchoring pin 86 which is attached to the support 78. The location of this pin is such that the spring exerts a closing force on the seal when the center line of the spring is to the right of the point 88. When the center line of the spring is to the left of the point 88, the spring exerts an opening force on the seal. The advantage of this arrangement is that the spring 82 holds the seal open during "start-up" operations without having to release the spring or to hold it open against spring tension.

The spring tension on the spring 82 can be adjusted in different ways. For example, it can be adjusted by locating the anchoring pin in one of a plurality of holes, e.g., from 2 to 8, in the support 78. Or, as shown in FIGS. 6 and 7, it can be adjusted by raising or lowering the threaded member 90 and tightening the nut 92 upon the support 94 which fits against the handle 76.

The safety latch 96 consists of the arm 98 which swivels about the pivot pin 100 and the movement of which is limited by the stop 102. The safety latch prevents the seal from being accidentally opened in excess of the normal operating amount due to the passage of uneven cross-sections of elongated material. The amount of opening allowed when the safety latch is in position is established by trial and error and is fixed by the length of the latch and the position of the pivot pin 100. This, of course, can be made adjustable if warranted by the particular operating conditions. The amount of the opening is indicated by the angle designated as 104 in FIG. 7.

In FIG. 6 the elements at the left of the drawing correspond to, and function in the same manner as, those just discussed at the right of the drawing and therefore, for convenience, have been given the same numbers plus a prime (') mark. In other words, the elements at the left of FIG. 6 which have been numbered as 74', 76', 78', 80', 82', 84', 85', 86', 90', 92', 94', 98', 100' and 102' correspond to these same elements numbered at the right of FIG. 6 but without the prime (') marks. As will be obvious to those skilled in the art, those elements at the left and the right of FIG. 6 which constitute the means for adjusting, opening and closing the seal formed by the rotatable sealing members 30 and 32 are coordinated in order to obtain the desired result.

It has been mentioned hereinbefore that the rotating sealing members can be either both spring-loaded or the one may be fixed and the other spring-loaded. This can be conveniently done by threading the end of one of the two shaft extensions, and then providing the threaded shaft with a locknut to hold one of the rotatable sealing members in position.

From the foregoing description it will be seen that the present invention provides a new and improved pressure-sealing device which is adapted to permit the continuous passage therethrough of a continuous length of elongated material during normal operation. This device comprises two counter-rotatable sealing members, which for ease of description may be designated as A and B, that mate to form a divided roll. These sealing members are so shaped that when mated with each other there is provided an opening through which the continuous length of elongated material can be continuously passed. Each of the sealing members A and B consists of a rounded base, which also may be termed a rounded shoulder; an extension which is fixedly attached to (more particularly integral with, as in a unitary structure) and leads forward from said base; and a shaft which is fixedly attached to (e.g., integral with, as in a unitary structure) and extends rearward from said base. The forward ends of the extensions A and B contact, respectively, the flat surfaces of the rounded bases of sealing members B and A.

The sealing device also includes essentially, in order to complete the seal, a seal enclosure which is adapted to house and to keep aligned the sealing members A and B. This enclosure has top and bottom walls with openings therein adapted to permit the passage therethrough of the continuous length of elongated material. It also has end walls, which may take the form of detachably mounted end plates, with openings therein adapted to permit the passage therethrough of the ends of the shafts of sealing members A and B.

The sealing device also includes means for maintaining the forward ends of the extensions A and B in positive contact with the flat surfaces of the rounded bases of sealing members B and A, respectively. Such means advantageously may take the form of spring-tensioning means, e.g., spring-tensioning means comprising a plurality of helically wound springs which are held in position by counterbores in one of the end walls of the seal enclosure.

Other modifications of or additions to the pressure-sealing device of this invention, as they are set forth in the specific claims in the application, will be apparent to those skilled in the art from the accompanying drawings of a preferred embodiment of the invention and illustrative thereof, and from the prior description herein with reference to said drawings.

The wearing surfaces of the sealing device of this invention, such as those of the rotatable sealing members, can be, for example, hard chrome plated; or they can be formed of any other suitable wear-resistant material.

FIGS. 9 and 10 show in FIG. 9 the use of one, and in FIG. 10 the use of two, of the sealing devices of the instant invention in connection with a pressure vessel 16 and the passage of a tow of filamentary material 106 through the exit port of such a vessel. The numerals 108 designate the sealing devices. Thus, the devices may be employed in apparatus used in carrying out a continuous method of treating a tow of polyacrylonitrile filamentary material which comprises continuously subjecting a tow of an oriented, polyacrylonitrile filamentary material to a hot fluid medium comprising steam, advantageously saturated steam, at a temperature within the range of from about 105° C. to about 115° C., preferably about 115° C. to about 140° C., under superatmospheric pressure. Thereafter the tow is cooled before being exposed to normal atmospheric pressure in a manner such as is described in the copending application of Richard W. Leins and William R. Osban, Serial No. 38,326, filed June 23, 1960, and assigned to the same assignee as the present invention.

The sealing device of the instant invention is a solution to the problem described in the earlier part of this specification. It satisfactorily fulfills the aims, objects and purposes of the invention. It can be used in apparatus commonly employed in the pressure treatment of elongated filamentary materials of all kinds, both organic and inorganic, and wherein the filamentary material is subject to such treatments as dyeing, resin-impregnation, crimping and the like. It can be used under any conditions wherein there is a pressure differential between two regions and wherein an elongated material, especially one in the form of a flat band or equivalent form, is to be continuously passed from one region to the other.

I claim:

1. A pressure-sealing device adapted to permit the continuous passage therethrough of a continuous length of elongated material during normal operation, said device comprising two counter-rotatable sealing members A and B that mate to form a divided roll and which are so shaped that when mated with each other there is provided an opening through which the said continuous length of elongated material can be continuously passed, each of said sealing members consisting of a rounded base, an extension which is fixedly attached to and leads forward from said base, and a shaft which is fixedly attached to and extends rearward from said base, the forward ends of the extensions of sealing members A and B contacting, respectively, the flat surfaces of the rounded bases of sealing members B and A; a seal enclosure adapted to house and to keep aligned the said counter-rotatable sealing members, said enclosure having top and bottom walls with openings therein adapted to permit the passage therethrough of the said continuous length of elongated material, and also having end walls with openings therein adapted to permit the passage therethrough of the ends of the shafts of the aforesaid sealing members; and means for maintaining the forward ends of the extensions of sealing members A and B in positive contact with the flat surfaces of the rounded bases of sealing members B and A, respectively.

2. A pressure-sealing device as in claim 1 wherein the means for maintaining the forward ends of the extensions of sealing members A and B in positive contact with the flat surfaces of the rounded bases of sealing members B and A, respectively, are spring-tensioning means.

3. A pressure-sealing device as in claim 2 wherein the spring-tensioning means comprise a plurality of helically-wound springs which are held in position by counterbores in one of the end walls of the seal enclosure.

4. A pressure-sealing device as in claim 1 which additionally includes an adapter plate for fitting the sealing device to the wall of a vessel adapted to receive and to discharge the continuous length of elongated material.

5. A pressure-sealing device as in claim 1 wherein at least one of the rotatable sealing members is spring-loaded.

6. A pressure-sealing device as in claim 1 wherein both of the rotatable sealing members are spring-loaded.

7. A pressure-sealing device as in claim 1 wherein at least one of the rotatable sealing members is spring-loaded by means of a spring which can be adjustably positioned.

8. A pressure-sealing device as in claim 7 wherein the spring can be both adjustably positioned and tensioned.

9. A pressure-sealing device as in claim 1 wherein both of the rotatable sealing members are spring-loaded by individual springs each of which can be both adjustably positioned and tensioned.

10. A pressure-sealing device as in claim 1 which additionally includes means including an adjusting screw for establishing a minimum closure between the rotatable sealing members.

11. A pressure-sealing device as in claim 1 which additionally includes at least one safety latch for preventing the seal from being accidentally opened, during operation of the device, in excess of the normal operating amount due to the passage of uneven cross-sections of elongated material.

References Cited in the file of this patent

UNITED STATES PATENTS

| | | |
|---|---|---|
| 814,124 | Fish | Mar. 6, 1906 |
| 2,367,174 | Renkin | Jan. 9, 1945 |